(12) United States Patent
Wierzbicki et al.

(10) Patent No.: US 7,423,859 B1
(45) Date of Patent: Sep. 9, 2008

(54) SYSTEM FOR PROTECTING COMPUTER EQUIPMENT FROM LIGHTNING VOLTAGE SURGES

(75) Inventors: Robert P. Wierzbicki, Worcester, MA (US); Brandon Barney, Hudson, MA (US)

(73) Assignee: EMC Corporation, Hopkinton, MA (US)

(*) Notice: Subject to any disclaimer, the term of this patent is extended or adjusted under 35 U.S.C. 154(b) by 223 days.

(21) Appl. No.: 10/953,156

(22) Filed: Sep. 29, 2004

(51) Int. Cl.
| | |
|---|---|
| H02H 3/22 | (2006.01) |
| H02H 3/20 | (2006.01) |
| H02H 9/04 | (2006.01) |
| H02H 9/00 | (2006.01) |
| H02H 1/00 | (2006.01) |
| H02H 1/04 | (2006.01) |
| H02H 9/06 | (2006.01) |
| H01C 7/12 | (2006.01) |
| H01L 29/93 | (2006.01) |
| H01L 29/861 | (2006.01) |

(52) U.S. Cl. .................. 361/111; 361/56; 361/91.1; 361/118; 257/601; 257/603

(58) Field of Classification Search ........... 361/111, 361/56; 257/601, 603
See application file for complete search history.

(56) References Cited

U.S. PATENT DOCUMENTS

| | | | | | |
|---|---|---|---|---|---|
| 4,586,104 | A | * | 4/1986 | Standler | 361/119 |
| 6,072,683 | A | * | 6/2000 | Masghati | 361/119 |
| 6,392,266 | B1 | * | 5/2002 | Robb et al. | 257/314 |
| 6,515,345 | B2 | * | 2/2003 | Robb et al. | 257/551 |
| 6,804,099 | B2 | * | 10/2004 | Michon et al. | 361/91.1 |
| 6,954,347 | B1 | * | 10/2005 | Chaudhry | 361/119 |
| 2002/0024965 | A1 | * | 2/2002 | Lee | 370/419 |
| 2003/0194908 | A1 | * | 10/2003 | Brown et al. | 439/620 |

* cited by examiner

Primary Examiner—Michael J Sherry
Assistant Examiner—Dharti H Patel
(74) Attorney, Agent, or Firm—Krishnendu Gupta; Scott A. Ouellette

(57) ABSTRACT

An apparatus for protecting electronic equipment from voltage surges includes a network interface coupled to a computer device for connecting the computer device to a computer network and a discrete voltage surge protection device coupled to the computer network with a first unshielded cable and to the network interface with a second unshielded cable. The unshielded cable comprises at least one wire pair and the discrete protection device comprises a voltage suppressor device coupled between the wires of each wire pair. The discrete voltage surge protection device renders the apparatus compliant with the Telcordia (Bellcore) GR-1089-CORE Intrabuilding Lightning Surge Tests.

20 Claims, 3 Drawing Sheets

SYSTEM FOR PROTECTING COMPUTER EQUIPMENT FROM LIGHTNING VOLTAGE SURGES

FIELD OF THE INVENTION

The present invention is directed generally to a system for protecting computer equipment from voltage surges and, more particularly, to a system for connecting computer equipment to a computer network with unshielded cabling while providing protection from voltage surges.

BACKGROUND OF THE INVENTION

In order for certain computer equipment to be certified for use in telecommunications networks, the communication ports used on the computer equipment must pass a set of Intrabuilding Lightning Surge tests, particularly the Telcordia (Bellcore) GR-1089-CORE Intrabuilding Lightning Surge Tests. These tests include two types of tests to determine whether computer equipment will be damaged or operational after a voltage surge caused by a lightning strike. The first test is a ±800 volt single ended (longitudinal) surge test and the second is a ±1,500 volt common (metallic) surge test. Currently, there are no devices which enable associated computer equipment to pass the tests. Current certification is achieved through an exemption in the test which indicates that the computer equipment will be considered certified if the computer equipment is connected to the network via grounded, shielded cables. However, shielded cabling is expensive and grounding the cabling can be logistically difficult. Therefore, the cost and implementation issues involved with providing grounded, shielded cable throughout an entire building for the purpose of constructing a local area network (LAN) can be prohibitive.

SUMMARY OF THE INVENTION

The present invention provides a discrete device which is external to the computer equipment and connected inline with the computer equipment between the computer equipment and the computer network. The device renders the computer equipment compliant with the Telcordia (Bellcore) GR-1089-CORE Intrabuilding Lightning Surge Tests while being coupled to the computer equipment and to the computer network with unshielded, ungrounded cabling. This results in the user of the computer equipment being able to protect only the computer equipment that requires protection without having to wire the entire LAN with grounded, shielded cabling.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views.

DETAILED DESCRIPTION

The invention provides voltage surge protection for computer systems which enables the computer systems to be certified under the Telcordia (Bellcore) GR-1089-CORE Intrabuilding Lightning Surge Tests without the need for grounded, shielded cabling. The Bellcore test requirements, as stated in document GR-1089-CORE, Issue 2, With Revision 1, dated February 1999, Section 4.5.9, Table 4-1, and Appendix A: Definition of Double-Exponential Impulse Waveform, define the lightning induced pulse by a double exponential waveform of duration A/B seconds. This is indicated by an exponential rate of rise A (from 10% to 90% of peak) and an exponential decay B (50% of peak). Under the Bellcore requirements, the duration ratio 2/10 μs is the defined shape of the pulse to be used in all surge testing at 100 A input current. The first test is a ±800 volt single ended (longitudinal) surge test and the second is a ±1,500 volt common (metallic) surge test. The present invention is utilized to enable the computer systems to pass the first test, i.e., the ±800 volt single ended (longitudinal) surge test.

Figure 1:
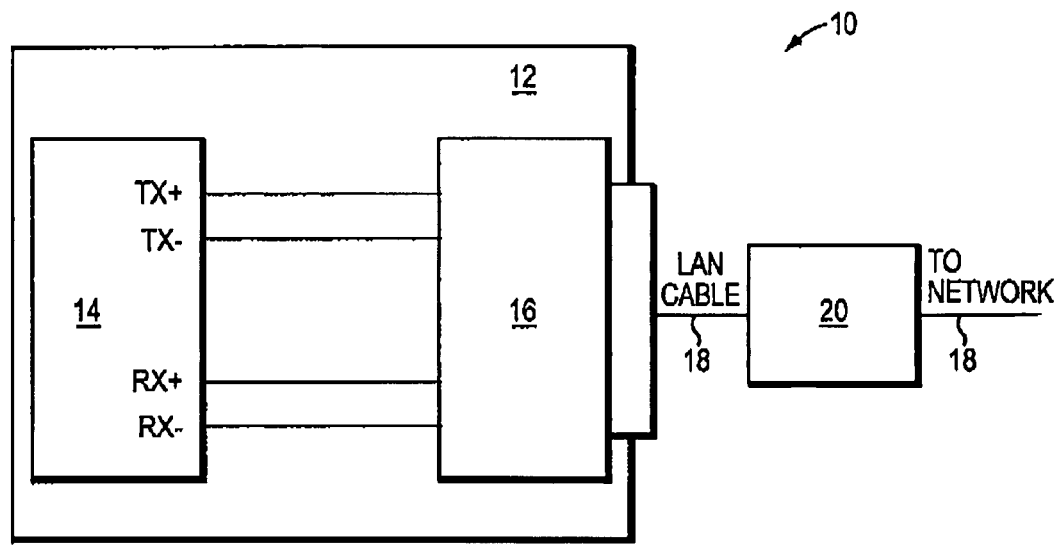
FIG. 1 is a schematic block diagram of the voltage surge protection system in accordance with the present invention.

FIG. 1 is a schematic block diagram of a first embodiment of the system 10 for protecting computer equipment from lightning voltage surges. Mounted internally to the computer equipment to be protected (not shown) is a network interface card (NIC) 12, which includes an Ethernet controller 14 and a 10/100 Ethernet LAN port 16. Two twisted pairs of wires TX+, TX− and RX+, RX− enable the transfer of data between the Ethernet controller 14 and the LAN port 16. An example of an Ethernet controller that may be used is the Intel® 82551ER Integrated 10BASE-T/100BASE-TX Ethernet Controller. An example of a LAN port that may be used is the RJmag (RJ-45 with Integrated 10/100 Base Tx LAN Magnetics), available from Amphenol® Data/Telecom Products of Ontario, Canada.

Figure 2A:
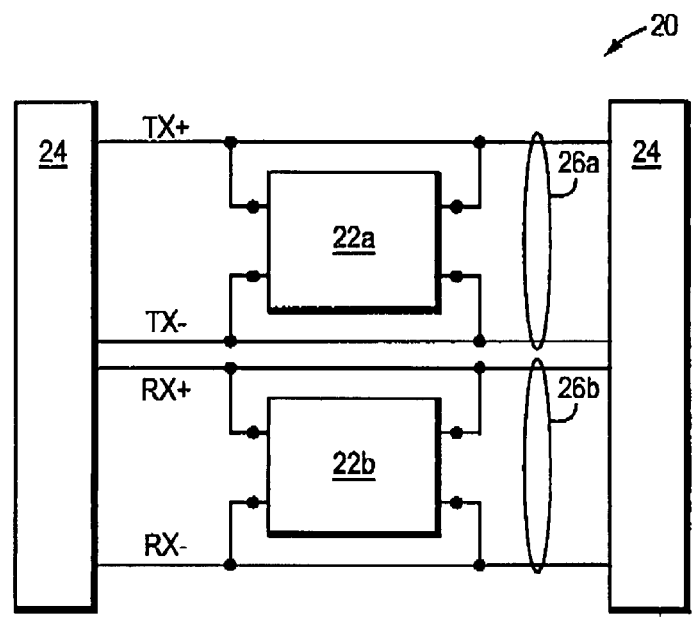
FIG. 2A is a more detailed schematic block diagram of the external voltage surge protection device of FIG. 1 in accordance with the present invention.
Figure 2B:
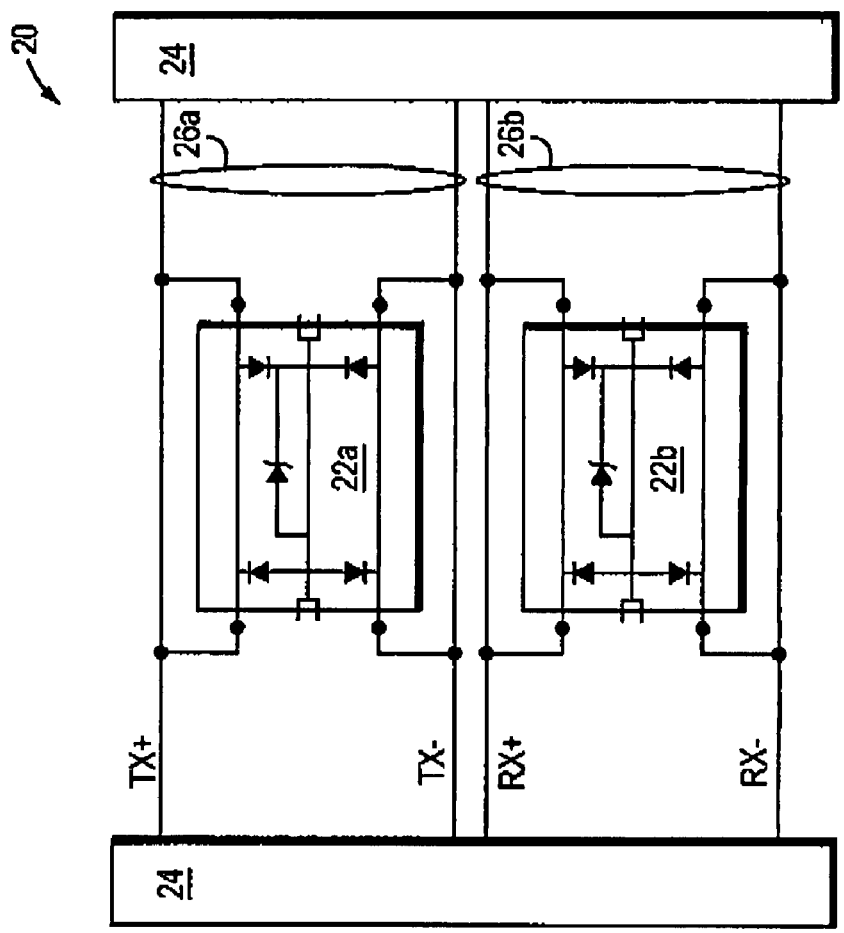
FIG. 2B is a more detailed schematic diagram of the external voltage surge protection device of FIG. 2A in accordance with the present invention.

An inline, external surge protection device 20 is coupled between the NIC 12 and the network (not shown) with ungrounded, unshielded 10/100 LAN cabling 18. External surge protection device 20 is shown in greater detail in FIG. 2A. External surge protection device 20 includes connectors 24 for connecting the device to the LAN cable 18 that connects the device 20 to the LAN port 16 and the network (not shown). The twisted wire pairs 26a, including the TX+ and TX− wires and 26b, including the RX+ and RX− wires, pass between the connectors 24 within device 20. A transient voltage suppressor 22a is connected between the TX+ and TX− wires of the wire pair 26a and a transient voltage suppressor 22b is connected between the RX+ and RX− wires of the wire pair 26b. Transient voltage suppressors 22a, 22b operate to provide protection against a voltage surge having a duration ratio of 2/10 μs and enable the device 20 to protect the LAN port 16 and Ethernet controller 14 from lightning surges, according to the requirements specified in the in the GR-1089-CORE Intrabuilding Lightning Surge Tests. An example of such a transient voltage suppressor is the LC03-3.3 Low Capacitance 3.3 Volt TVS for High Speed Interfaces, available from Semtech Corporation of Camarillo, Calif. FIG. 2B is a schematic diagram showing the implementation of each LC03-3.3 into the external surge protection device 20.

Figure 3:
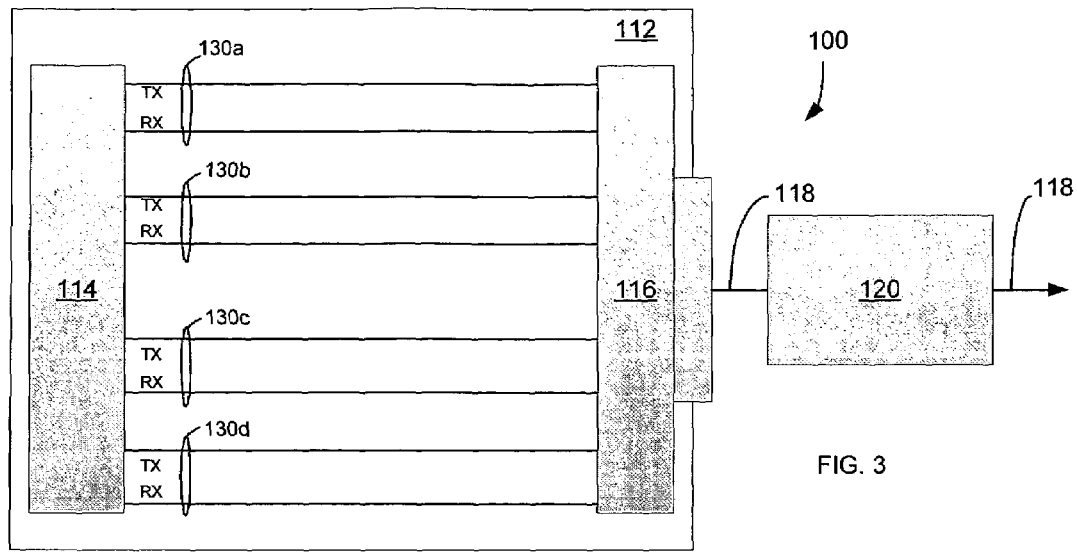
FIG. 3 is a schematic block diagram of another embodiment of the voltage surge protection system in accordance with the present invention.
Figure 4:
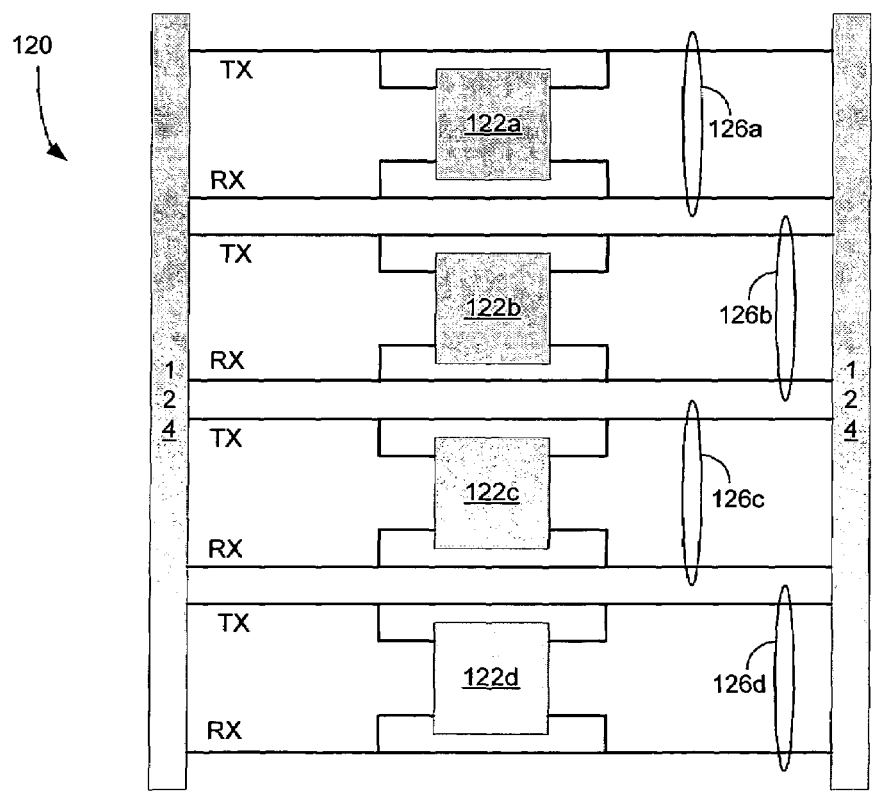
FIG. 4 is a more detailed schematic block diagram of the external voltage surge protection device of FIG. 3 in accordance with the present invention.

FIG. 3 is a schematic block diagram of another embodiment of a system 100 for protecting computer equipment from lightning voltage surges. In this embodiment, the LAN is a 1000BASE T network. Mounted internally to the computer equipment to be protected (not shown) is a NIC 112, which includes an Ethernet controller 114 and a 1000BASE T Ethernet LAN port 116. Four combined TX/RX pairs of wires 130a-130d enable the transfer of data between the Ethernet controller 114 and the LAN port 116. An inline, external surge protection device 120 is coupled between the NIC 112 and the network (not shown) with ungrounded, unshielded 1000BASE T LAN cabling 118. External surge protection device 120 is shown in greater detail in FIG. 4.

External surge protection device 120 includes connectors 124 for connecting the device 120 to the LAN cable 118 that connects the device 120 to the LAN port 116 and the network (not shown). Since the 1000BASE T LAN cabling comprises four combined TX/RX wire pairs 126a-126d, device 120 includes transient voltage suppressors 122a-122d, coupled between the wires of the associated wire pair. Transient voltage suppressors 122a-122d are identical to transient voltage suppressors 22a and 22b of the device 20 of FIG. 2a, and operate to enable the NIC 112 to withstand the types of voltage surges applied to the equipment according to the Telcordia (Bellcore) GR-1089-CORE Intrabuilding Lightning Surge Tests.

Accordingly, the present invention provides a system that enables computer equipment used in the telecommunication space to be compliant with the Telcordia (Bellcore) GR-1089-CORE Intrabuilding Lightning Surge Tests without the use of grounded and shielded cabling. In one embodiment, the invention includes a surge protection device that is connected inline with the unshielded cabling between the computer equipment and the LAN to which the computer equipment is connected. The device is external to the computer equipment, and thus can be utilized in conjunction with only those ports of the computer equipment that need to be compliant with the GR-1089-CORE standard. This system takes up no real estate within the computer equipment and does not cause or add to radiated noise emissions from the LAN cable. Furthermore, there is no need for an external ground connection, as required in the prior art.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. An apparatus for protecting electronic equipment from voltage surges comprising:
   a network interface coupled to a computer device for connecting the computer device to a computer network; and
   a discrete protection device coupled to the computer network with a first ungrounded and unshielded cable and to the network interface with a second ungrounded and unshielded cable;
   wherein the first ungrounded and unshielded cable and the second ungrounded and unshielded cable comprise at least one wire pair and the discrete protection device comprises a voltage suppressor device coupled between the wires of each wire pair.

2. The apparatus of claim 1 wherein the computer network comprises a local area network (LAN).

3. The apparatus of claim 2 wherein the voltage suppressor device comprises a low capacitance transient voltage suppressor.

4. The apparatus of claim 3 wherein the first and second ungrounded and unshielded cables each comprise at least two wire pairs and the discrete protection device comprises a low capacitance transient voltage suppressor coupled between the wires of each wire pair.

5. The apparatus of claim 4 wherein the network interface comprises an Ethernet controller coupled to the computer device and an Ethernet connector coupled to the discrete protection device through the second ungrounded and unshielded cable.

6. The apparatus of claim 5 wherein the first and second ungrounded and unshielded cables each comprise four wire pairs.

7. The apparatus of claim 1 wherein the discrete protection device is configured to protect the apparatus from a ±800 volt single ended (longitudinal) surge.

8. The apparatus of claim 2 wherein the network interface comprises an Ethernet controller coupled to the computer device and an Ethernet connector coupled to the discrete protection device through the second ungrounded and unshielded cable.

9. The apparatus of claim 8 wherein the first and second ungrounded and unshielded cables each comprise four wire pairs.

10. An apparatus for protecting electronic equipment from voltage surges comprising:
    a network interface coupled to a computer device for connecting the computer device to a computer network; and
    a discrete voltage surge protection device coupled to the computer network with a first ungrounded and unshielded cable and to the network interface with a second ungrounded and unshielded cable;
    wherein the first and second ungrounded and unshielded cables comprise at least one wire pair and the discrete voltage surge protection device comprises a voltage suppressor device coupled between the wires of each wire pair; and
    wherein the discrete voltage surge protection device is configured to protect the apparatus from a ±800 volt single ended (longitudinal) surge.

11. The apparatus of claim 10 wherein the computer network comprises a local area network (LAN).

12. The apparatus of claim 11 wherein the voltage suppressor device comprises a low capacitance transient voltage suppressor.

13. The apparatus of claim 12 wherein the first and second ungrounded and unshielded cables each comprise at least two wire pairs and the discrete protection device comprises a low capacitance transient voltage suppressor coupled between the wires of each wire pair.

14. The apparatus of claim 13 wherein the network interface comprises an Ethernet controller coupled to the computer device and an Ethernet connector coupled to the discrete protection device through the second ungrounded and unshielded cable.

15. The apparatus of claim 14 wherein the first and second ungrounded and unshielded cables each comprise four wire pairs.

16. An apparatus for protecting electronic equipment from voltage surges comprising:
    a network interface coupled to a computer device for connecting the computer device to a computer network; and
    a discrete voltage surge protection device coupled to the computer network with a first ungrounded and unshielded cable and to the network interface with a second ungrounded and unshielded cable;

wherein the first and second ungrounded and unshielded cables comprise at least one wire pair and the discrete voltage surge protection device comprises a low capacitance transient voltage suppressor coupled between the wires of each wire pair; and wherein the discrete voltage surge protection device is configured to protect the apparatus from a ±800 volt single ended (longitudinal) surge.

17. The apparatus of claim 16 wherein the computer network comprises a local area network (LAN).

18. The apparatus of claim 17 wherein the network interface comprises an Ethernet controller coupled to the computer device and an Ethernet connector coupled to the discrete protection device through the second ungrounded and unshielded cable.

19. The apparatus of claim 7 wherein the ±800 volt single ended (longitudinal) surge has a duration ratio of 2/10 μs.

20. The apparatus of claim 10 wherein the ±800 volt single ended (longitudinal) surge has a duration ratio of 2/10 μs.

* * * * *